(12) United States Patent
Alessandrini et al.

(10) Patent No.: US 11,951,785 B2
(45) Date of Patent: Apr. 9, 2024

(54) MECHANICAL COUPLING DEVICE BETWEEN VEHICLES, IN PARTICULAR FOR CONVOYS OF AUTOMATIC VEHICLES

(71) Applicant: UNIVERSITA' DEGLI STUDI DI FIRENZE, Florence (IT)

(72) Inventors: Adriano Alessandrini, Florence (IT); Fabio Cignini, Florence (IT)

(73) Assignee: UNIVERSITA' DEGLI STUDI DI FIRENZE, Florence (IT)

( * ) Notice: Subject to any disclaimer, the term of this patent is extended or adjusted under 35 U.S.C. 154(b) by 83 days.

(21) Appl. No.: 17/625,930

(22) PCT Filed: Jul. 17, 2020

(86) PCT No.: PCT/IB2020/056751
§ 371 (c)(1),
(2) Date: Jan. 10, 2022

(87) PCT Pub. No.: WO2021/048647
PCT Pub. Date: Mar. 18, 2021

(65) Prior Publication Data
US 2022/0242178 A1 Aug. 4, 2022

(30) Foreign Application Priority Data

Jul. 17, 2019 (IT) .................. 102019000012120

(51) Int. Cl.
*B60D 1/155* (2006.01)
*B60D 1/14* (2006.01)
(Continued)

(52) U.S. Cl.
CPC ............. *B60D 1/155* (2013.01); *B60D 1/143* (2013.01); *B60D 1/481* (2013.01); *B62D 13/00* (2013.01)

(58) Field of Classification Search
CPC ........ B60D 1/143; B60D 1/481; B60D 1/155; B62D 13/00
(Continued)

(56) References Cited

U.S. PATENT DOCUMENTS 1,304,276 A      5/1919  De Haeseleer
1,326,551 A  *  12/1919  Turnbull .................. B60D 1/44
                                                                280/495
(Continued)

FOREIGN PATENT DOCUMENTS

DE      26 43 325       3/1978
DE      28 44 684       4/1980
(Continued)

OTHER PUBLICATIONS

International Search Report dated May 3, 2021 issued in PCT International Patent Application No. PCT/IB2020/056761, 4 pp.

Primary Examiner — Anne Marie M Boehler
Assistant Examiner — Felicia L. Brittman
(74) Attorney, Agent, or Firm — NIXON & VANDERHYE P.C.

(57) ABSTRACT

A coupling device between a first vehicle (A) and a second vehicle (B) includes a hinge coupling section associated with the first vehicle (A) and a drawbar section associated with the second vehicle (B). The drawbar section has an arc-shaped guide arranged horizontally in front of the second vehicle (B) to extend from the right side to the left side thereof, a slider sliding along the arc-shaped guide and a telescopic arm integral with one end of the slider and rotatably connected to the coupling section. A steering assistance mechanism provides for redundancy of the steering members (S) of the second vehicle (B). The coupling device allows the automatic guide system to control the vehicle position and trajectories without any substantial exchange of forces through the device and allows the safe (Continued)

stop of the convoy when there are anomalies in the operation of the automatic guide system.

10 Claims, 4 Drawing Sheets

(51) Int. Cl.
  *B60D 1/48* (2006.01)
  *B62D 13/00* (2006.01)
(58) Field of Classification Search
  USPC .......................................................... 280/400
  See application file for complete search history.

(56) References Cited

U.S. PATENT DOCUMENTS

| | | | |
|---|---|---|---|
| 5,468,007 A | 11/1995 | Kanerva |
| 5,725,231 A | 3/1998 | Buie |

FOREIGN PATENT DOCUMENTS

| | | |
|---|---|---|
| EP | 0 765 770 | 9/1996 |
| EP | 0 982 161 | 8/1999 |
| FR | 487708 | 7/1918 |
| GB | 2 219 979 | 12/1989 |
| WO | WO 2018/228945 | 12/2018 |

\* cited by examiner

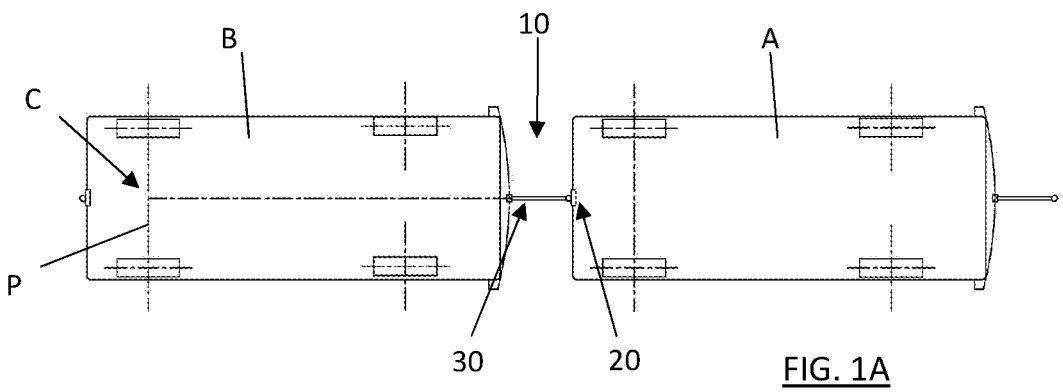
FIG. 1A
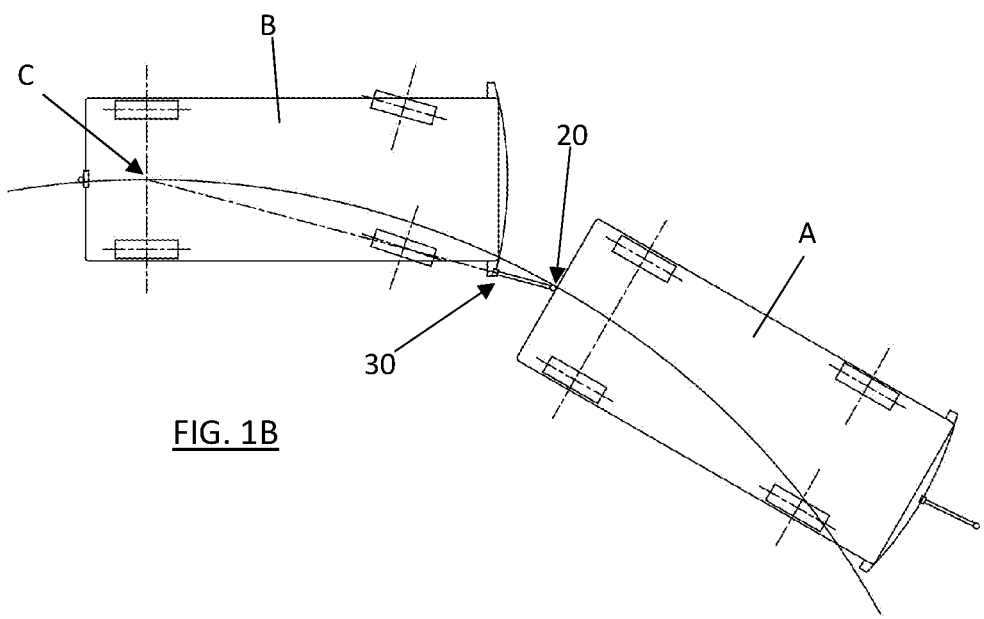
FIG. 1B
FIG. 1

MECHANICAL COUPLING DEVICE BETWEEN VEHICLES, IN PARTICULAR FOR CONVOYS OF AUTOMATIC VEHICLES

This application is the U.S. national phase of International Application No. PCT/IB2020/056751 filed Jul. 17, 2020 which designated the U.S. and claims priority to Italian Patent Application No. 102019000012120 filed Jul. 17, 2019, the entire contents of each of which are hereby incorporated by reference.

TECHNICAL SECTOR

The present invention relates to a mechanical coupling device between two vehicles, in particular for convoys of automatically guided vehicles.

STATE OF THE ART

Developments in transport sector electronics have recently made platooning road vehicles possible, i.e., the construction of convoys consisting of some vehicles in columns of which none or at most only the first is guided by a driver, while the other vehicles automatically follow the first. The vehicles are connected from the point of view of information exchange to enable the following vehicles to slow down and accelerate at the same time as the first, thus maintaining the same distance from each other, and to enable them to steer in the same direction but with an appropriate phase delay with respect to the preceding vehicle so as to be able to follow the same trajectory.

Although electronic technologies are now mature enough to allow the platooning of both road vehicles used for public transport and also commercial vehicles, for regulatory and safety needs there must be a mechanical connection between the vehicles of the convoy.

Vehicle towing devices have been known for some time, which essentially include a hinge coupling section associated with the preceding vehicle and a drawbar section associated with the following vehicle. The two sections each have a proximal portion rigidly connected to the respective vehicle and a distal reciprocal connection portion with possibility of rotation. Such devices are intended to transfer force and thus allow towing. These systems are relatively easy to implement and, thanks to the absence of relative motions (aside from the single mono-axial rotation movement) they allow to easily associate pipes for fluids and electrical sockets for energy exchange. However, the devices of this type rigidly connect the two vehicles with a single degree of freedom of rotation with respect to the vertical axis of the hinge connection between the two sections of the towing device and are therefore not at all suitable to allow the automatic guide system to manage the guiding of the following vehicle in such a way as to allow it to travel exactly the same trajectory as the preceding one. Furthermore, in such conventional systems equipped with only one degree of freedom of rotation, when the results of the forces exchanged is positive (the preceding vehicle pulls more than the following vehicle), a behaviour arises which tends to stabilize the convoy, while in the event of a negative result the convoy tends to diverge, so that each vehicle tends to steer in the opposite direction with respect to the preceding vehicle, resulting in the breakage of the hook, precisely in emergency cases where it is fundamental for the braking to function.

Coupling devices are also known in which the drawbar section includes an elongating arm, with the aim of allowing an independent steering between the vehicles and still maintaining reduced radii of curvature. In fact, when two vehicles are in a curve, for the geometry of the vehicles the distance between the rear centre zone of the preceding vehicle and the front centre zone of the following vehicle is elongated.

Other coupling devices of the known art, described for example in EP0982161, U.S. Pat. Nos. 5,725,231, 5,468,007 and GB2219979 include the presence of circle-arch guide rails along which a slider can slide which carries the arm of the drawbar section, so as to be able to move the point of application of the force exchanged between the two vehicles. In these, the arcuate rail is integral with the preceding vehicle, and the geometry is not designed to determine a specific point of application of the force exchanged between the vehicles on the following vehicle.

EP0765770 A1 describes a coupling device usable to couple a locomotor vehicle to a trailer which is not equipped with steering members. This document also includes a circle-arch guide rail which is integral with the following vehicle. In this document, the slider sliding along the rail is a pin to which the drawbar section arm is pivotally connected in an intermediate section thereof, while the end of the arm is hinged at a fixed point of the trailer which is positioned in front with respect to the axles of the trailer itself.

Furthermore, none of the mechanical coupling devices of the known art provides kinematic members capable of coupling with the steering means of the following vehicle to control them or at least influence the positioning thereof.

SUMMARY OF THE INVENTION

The main object of the present invention is to propose a mechanical coupling device between two vehicles which allows, within certain safety intervals, a complete relative freedom of movement between the two vehicles, suitable in particular to constitute a mechanical safety connection system for automatically guided vehicles.

Another object of the present invention is to propose a mechanical coupling device between two vehicles which is suitable for creating a redundancy on the maintenance of the reciprocal distance and on the setting of the steering angle imposed by the automatic guiding in convoys of automatically guided vehicles.

A further object of the present invention is to propose a mechanical coupling device between two vehicles suitable for determining reciprocal movement constraints between the two vehicles only when the reciprocal distance and the steering angle deviate beyond a certain limit beyond those which should be imposed by an automatic guiding system of convoys.

According to one aspect of the present invention, the aforementioned objects are achieved by means of a coupling device according to claim 1.

In particular, conventionally a mechanical coupling device of the type envisaged between a first vehicle with at least two axes and a second vehicle with at least two axes and comprising steering members with the first vehicle arranged to precede the second vehicle, comprises a hinge coupling section associated with said first vehicle and a drawbar section associated with the second vehicle, said sections each having a proximal portion rigidly connected to the respective vehicle and a distal reciprocal connection portion with the possibility of rotation.

According to a peculiar aspect of the present invention, the drawbar section of the device comprises:

an arc-shaped guide integral with said second vehicle, said arc-shaped guide being extended horizontally between a right side and a left side of said second vehicle, the radius of curvature and the positioning of said arc-shaped guide being such that the centre of the relative radius of curvature is in a rear area of said second vehicle, substantially on the centreline of a rear axle thereof;

a slider arranged to slide along said arc-shaped guide;

a telescopic connecting arm rigidly connected at one end to said slider and rotatably connected at the other end thereof to said coupling section, said telescopic connecting arm having a maximum length and a minimum length such as to define a maximum distance and a minimum distance, respectively, between said first vehicle and said second vehicle.

A mechanical coupling device as outlined above is particularly suitable for application to convoys of automatically guided vehicles as it does not rigidly connect two successive vehicles together, leaving the automatic guide system to determine the speeds and trajectories thereof, but at the same time constitutes a safety constraint between the two vehicles where the behaviour of the vehicles deviates beyond certain limits from what is ideally imposed by a perfectly functioning automatic guide system.

Advantageously, the drawbar section comprises a steering assistance mechanism associated with said slider and said steering members of the second vehicle, said steering assistance mechanism being configured to act on said steering members so as to tend to maintain a steering position of said second vehicle which is a function of the position of said slider along said guide.

The steering assistance mechanism can influence the steering members of the following vehicle as a function of the position of the slider, so that if there were excessive deviations between the ideal steering angle, imposed by a perfectly functioning automatic guide system, and the actual steering angle, the mechanism would tend to control the steering members to return them to the correct trajectory setting.

Further advantageous features of a mechanical coupling device according to the present invention are set forth in the dependent claims.

BRIEF DESCRIPTION OF THE DRAWINGS

These and other aspects and advantages of the invention will be comprehensible from the following description of an embodiment of the same, provided by way of non-exhaustive example, with the aid of the accompanying drawings, in which:

FIG. 1 shows a schematic top view joined in a convoy and mechanically connected by a device according to the present invention: FIG. 1a shows the two vehicles in a situation of straight motion; FIG. 1b shows the two vehicles in the steering phase;

DETAILED DESCRIPTION OF PREFERRED EMBODIMENTS

Figure 5:
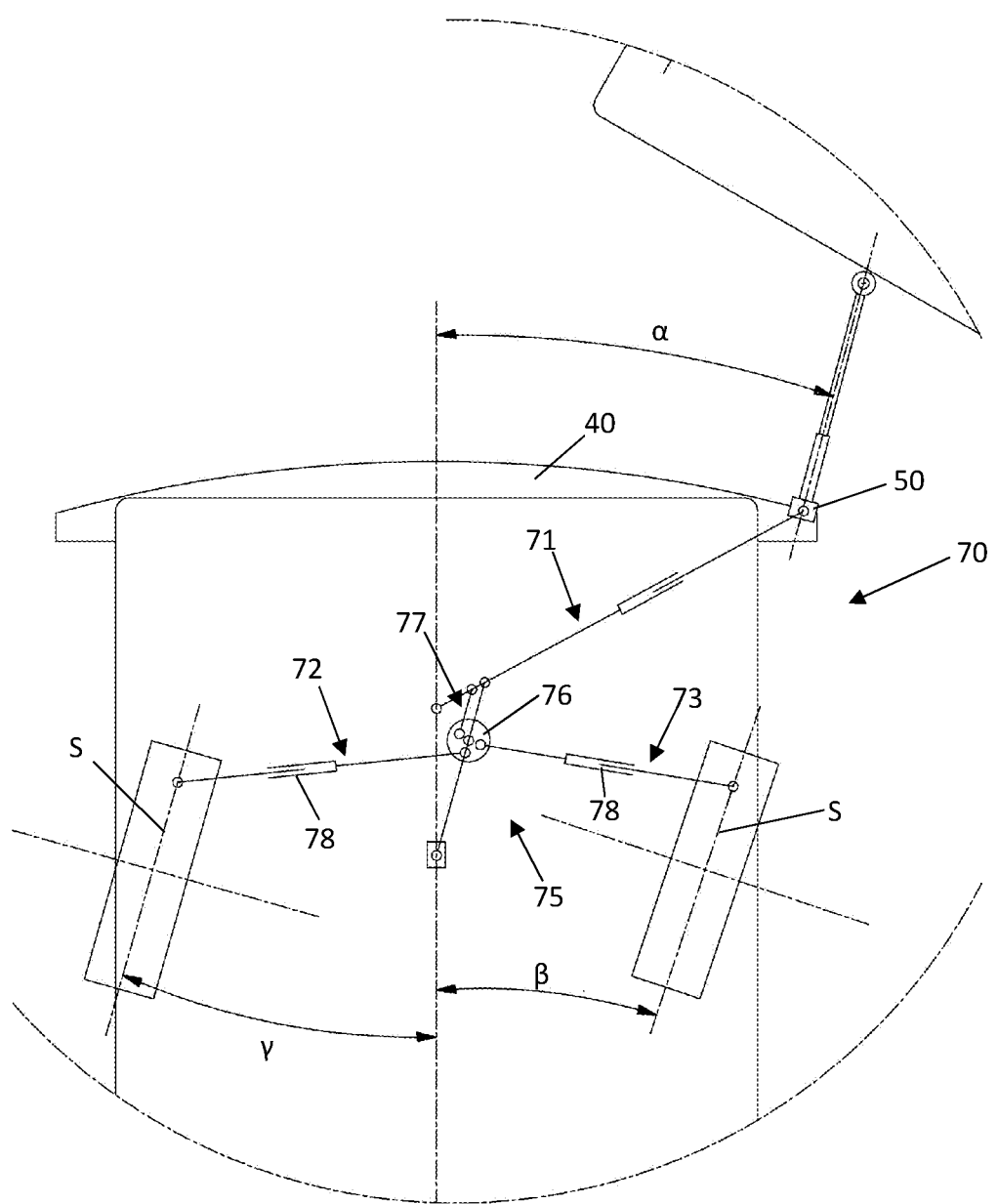
FIG. 5 shows, in a schematic top view, an embodiment of a device according to the present invention.

With reference to FIG. 1, the number 10 generally indicates a coupling device envisaged between a first vehicle, A, of the type with two axes and a second vehicle, B, also of the type with two axes. The first vehicle A is arranged to precede the second vehicle B. The vehicles A and B are advantageously part of a convoy comprising further vehicles arranged in succession and in which the individual vehicles and the entire convoy are guided by an automatic guide system of the type suitable to allow the vehicles of the convoy to all travel the same trajectories while substantially maintaining the reciprocal distance unchanged. Both the preceding vehicle or first vehicle A and the following vehicle or second vehicle B are equipped with their own steering system S suitable for steering at least the relative front axle (FIG. 5). In particular, in the embodiment shown in FIG. 1, the first and second vehicle A and B have a steering front axle and a non-steering rear axle.

Figure 2:
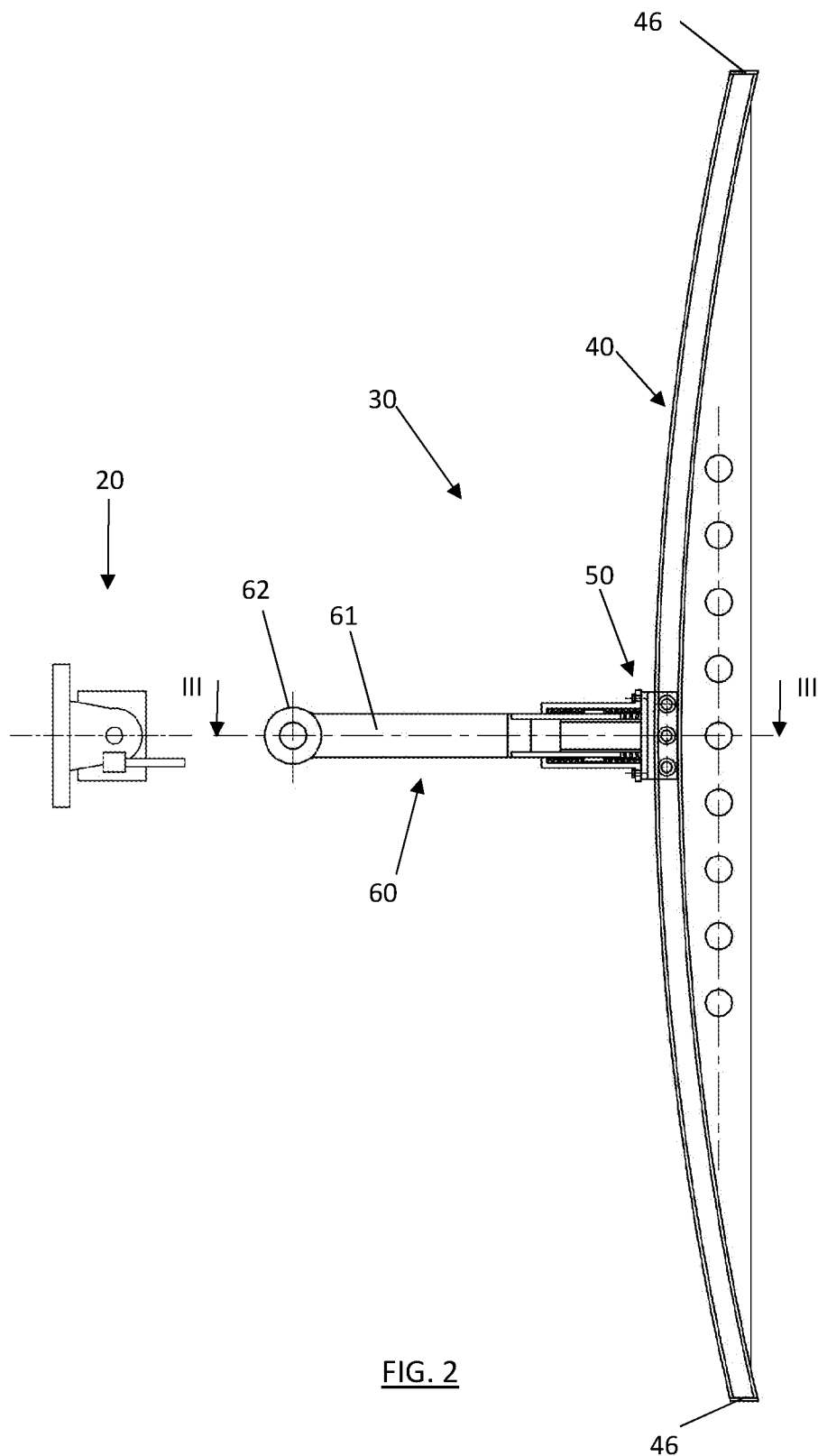
FIG. 2 shows a top view of a device according to the present invention.
Figures 3, 4:
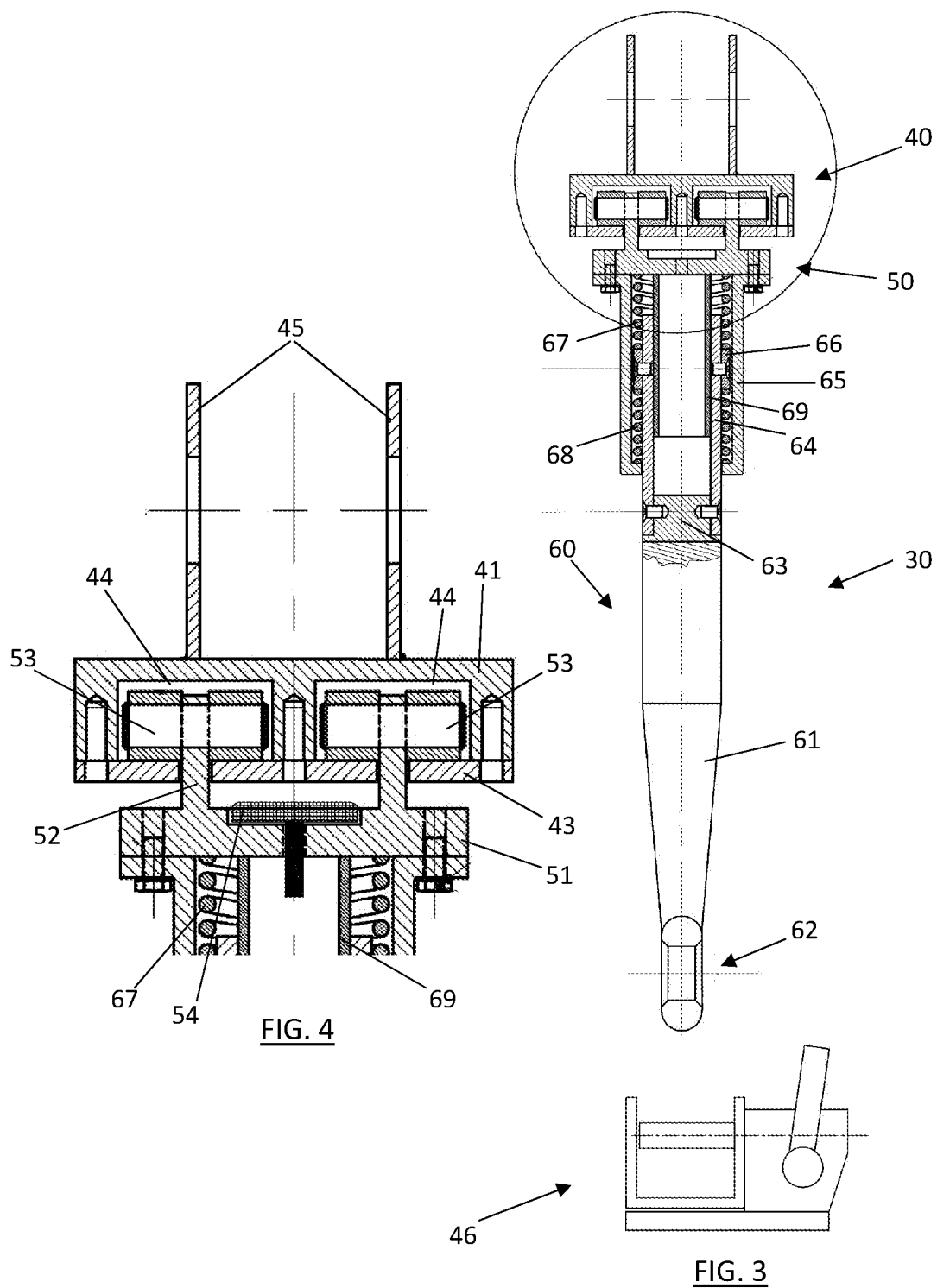
FIG. 3 shows a section view of the device of FIG. 2 along the line of the section III-III.
FIG. 4 shows a detail of FIG. 3.

Referring also to FIGS. 2 to 4, the coupling device 10 comprises a hinge coupling section, 20, suitable to be stably associated with said first vehicle A and a drawbar section, 30, suitable to be stably associated with the second vehicle B. Each of the two sections 20, 30 has a proximal portion rigidly connected to the respective vehicle and a distal reciprocal connection portion with the possibility of rotation. The distal portion of the two sections 20 and 30 advantageously allows the reciprocal free rotation with respect to a vertical axis and also allows some freedom of rotation (at least some degrees) with respect to two horizontal rotation axes orthogonal to each other.

The drawbar section 30 comprises:

an arc-shaped guide, 40 integral with the second vehicle B, said arc-shaped guide being extended horizontally between a right side and a left side of said second vehicle B and having a radius of curvature and being positioned with respect to said second vehicle B in such a way that the centre C of the relative radius of curvature is substantially on the centreline of a rear axle P of said second vehicle B;

a slider, 50, arranged to slide along said arc-shaped guide 40;

a telescopic connecting arm 60 rigidly connected at one end to said slider 50 and rotatably connected at the other end thereof to said coupling section 20, said telescopic connecting arm 60 having a maximum length and a minimum length such as to define a maximum distance and a minimum distance, respectively, between said first vehicle A and said second vehicle B.

The arc-shaped guide 40 comprises a container body 41 centrally provided with a separation septum 42, and a cover 43, which determine two overlapping rails 44. The guide 40 further comprises two reinforcing flaps, 45, which confer greater flexural strength and by means of which the arc-shaped guide 40 is anchored to the second vehicle B. There are respective removable side covers 46 at the two ends of the arc-shaped guide 40, the removal of which allows the assembly of the slider 50 in the rails 44 and which once fixed to the container body 41 constitute end-of-stroke elements for the sliding movements of the slider 50.

The slider 50 comprises a plate, 51, and two supports, 52, which are inserted into slots of the cover 43 and at whose ends freely pivoting pins 53 are mounted, housed in the rails 44 to roll on the relative rolling surfaces. A shoe 54 is associated with the slider 50 between the plate 51 and the cover 43 and is operable on the other side of the plate 51 to selectively interact with the cover 43 so as to constitute locking members capable of blocking the sliding of the slider 50 along the arc-shaped guide 40 when the telescopic arm reaches a certain minimum length. The interaction between the shoe 54 and the outer surface of the cover 43 is advantageously by friction, but may alternatively occur by interference, shaping the surfaces of the shoe 54 and the cover 43 with suitable teeth.

The telescopic connecting arm 60 comprises a towing eye, 61, constituting the distal portion of the drawbar section 30 provided at one end of an annular body, 62, constituting the coupling member with the coupling section 20. At the opposite end of the towing eye 61 there is a flange 63, to which a tubular element 64 is clamped, which telescopically inserts into a bell-shaped element, 65, integral with the slider 50. The tubular element 64 has a shoulder 66 in a longitudinally intermediate section, which constitutes an abutment element for two compression springs 67, 68. A first compression spring 67 acts between the shoulder 66 and the slider 50, thus constituting resilient members arranged to oppose the shortening of the telescopic arm 60 with respect to a neutral configuration. A second compression spring 68 acts between the shoulder 66 and the bell-shaped element 65, thus constituting resilient members arranged to oppose the elongation of the telescopic arm 60 with respect to a neutral configuration. The maximum shortening stroke of the telescopic arm 60 is constituted by the distance between the tubular element 64 and the slider 50, as the outer surface of the plate 51 constitutes an end-of-stroke element for the displacement of the tubular element 64 with respect to the bell-shaped element 65. The shoulder 66 is advantageously composed of a clamping ring removably associated with the tubular element 64. The tubular element 64 and the shoe 54 of the slider 50 are configured and arranged in such a way that when the tubular element 64 reaches the proximity of the relative end-of-stroke it operates the shoe 54, pushing it to engage with the arc-shaped guide 40 and thus causing the blocking of the sliding movement of the slider 50 along the arc-shaped guide 40. A reinforcing tubular 69 is arranged inside the tubular element 64, coaxial thereto, to guide the telescopic movement inside the bell-shaped element 65.

A coupling device 10 as described above functions in the following manner. In convoys of automatically guided vehicles, in a condition of regular operation, the mechanical coupling device 10 is not used for a continuous exchange of forces between the two vehicles since the automatic guide system is responsible for maintaining the distance between two consecutive vehicles and setting the correct trajectories. The configuration of the coupling device 10 allows the automatic guide system to set the correct trajectories for the following vehicle B thanks to the fact that the connecting arm 60 between the two vehicles A and B can slide along the arc-shaped guide 40. When there are small deviations between the ideal reciprocal positioning which the automatic guide system should impose and the actual reciprocal positioning of the two vehicles, there is an exchange of forces between the two vehicles through the device 10. In these cases, small variations in distance between the two vehicles are allowed by the telescopic arm 60 which, thanks to the resilient members with which it is equipped, allows a progressive increase in the forces exchanged between the two vehicles A and B. In addition, the geometry of the arc-shaped guide 40 and the relative modes of connection to the frame of the following vehicle B are such that, following the movement of the slider 50, and therefore also of the telescopic arm 60 along the arc-shaped guide 40, the point of application of force on the following vehicle is maintained at the centreline of a rear, non-steering axle of the same second vehicle B. This peculiarity reverses the behaviour with respect to the conventional systems so that when the result of the forces exchanged between the two vehicles is positive (the preceding vehicle pulls more than the following vehicle), the behaviour is divergent, while if it is negative (the preceding vehicle brakes more than the following vehicle), it is convergent. In the convoys of automatically guided vehicles, the divergence in traction can be managed thanks to the active control of the automatic guiding itself, because if there is traction it is assumed that this and the entire system functions correctly. Otherwise, if the automatic guiding was not functioning, a generic fault signal would be produced which would force the entire convoy to stop and automatically be in a stop condition resulting in negative forces and suitably converging behaviour of the vehicles. Furthermore, when the distance between the two vehicles A and B is reduced beyond a certain limit, the telescopic arm 60 reaches the end-of-stroke and the tubular element 64 drives the shoe 54 which blocks the sliding of the slider 50 along the arc-shaped guide 40.

With reference to FIG. 5, a particularly advantageous embodiment of a mechanical coupling device according to the present invention also envisages a steering assistance mechanism 70, associated with the slider 50 and steering members S of the second vehicle B. The steering assistance mechanism 70 is configured to act on the steering members S so as to tend to maintain a steering position of the second vehicle B which is a function of the position of the slider 50 along the arc-shaped guide 40.

The steering assistance mechanism 70 mechanically connects the position of the slider 50 along the guide with the steering angle of the second vehicle B, and the configuration thereof obviously depends on the geometry of the steering system of the second vehicle B. In the embodiment shown in FIG. 5, the steering assistance mechanism 70 comprises a telescopic rod 71 for connection to the slider 50, two hub carrier connecting rods 72, 73, and an actuating mechanism 75 comprising an eccentric member 76 to which the aforementioned hub carrier connecting rods 72, 73 are connected and an articulated parallelogram mechanism 77 which connects the telescopic rod 71 with the eccentric member 76. The rotation of the telescopic rod 71 which occurs following the movement of the slider 50 along the arc-shaped guide 40 modifies the position and geometry of the articulated parallelogram mechanism 77 which modifies the position and orientation of the eccentric member 76 which in turn pushes or pulls the hub carrier connecting rods 72 and 73 thereby actuating the steering members S of the second vehicle B. Advantageously, the hub carrier connecting rods 72 and 73 have elastic shock absorbers, 78, which allow slight differences between the steering angle imposed by the steering members S and the steering angle imposed by the steering assistance mechanism 70 of the mechanical coupling device of the invention.

The steering assistance mechanism 70 constitutes a redundant mechanical steering control system with respect to the steering members S of the vehicle. The steering assistance mechanism 70 exploits a linear proportionality link existing between the angle $\alpha$ underlying the axis of the telescopic arm 60 and the longitudinal axis of the vehicle, and the angles $\beta, \gamma$, of inclination of the wheels always with respect to the longitudinal axis of the vehicle.

When the second vehicle B is connected in a convoy by the device of the invention, the position of the slider 50 along the arc-shaped guide 40 redundantly determines the steering angle of the wheels when they also form the steering members S of the vehicle. In situations of proper operation of the automatic guide system this does not create any problem, as the latter and the steering assistance mechanism 70 set the same steering angle. The elastic shock absorbers 78 of the steering assistance mechanism 70 allow a certain tolerance of the difference between the steering angle set by the steering members S of the vehicle and that set by the steering assistance mechanism 70, a tolerance which may be necessary for dynamic reasons, which lead to different behaviours of the vehicles forming the convoy, for example due to different vehicle conditions (tyre drift, delay in response to the application of a steering angle, suspension members, different load on board, etc.). When this tolerance is exceeded it means that there is a malfunction of the automatic guide system and then the vehicle train must stop. In such conditions the resulting forces transmitted through the mechanical coupling device will always be negative and the tendency to convergence imposed by the device of the invention in such situations results in a stability of the convoy and thus a safety improvement in emergency conditions.

Compared to those depicted and described, there can certainly be variations in construction, albeit always in application of the concepts of creating a mechanical coupling device as expressed above. In particular, as already highlighted, the geometry and connection methods of the arc-shaped guide 40 to the second vehicle B are obviously a function of the construction and dimensional characteristics of the second vehicle B itself, and the same applies to the steering assistance mechanism 70 whose geometry depends on that of the steering members S of the second vehicle B.

The advantages set forth above of the described embodiments of a mechanical coupling device between vehicles according to the present invention, in particular for convoys of automatically guided vehicles, remain protected even in the presence of further variants and embodiments. In fact, the embodiments described and represented are only by way of example and not of limitation, so that a device according to the present invention may provide for further modifications and variations of a practical application nature, while remaining within the scope of protection provided by the following claims.

The invention claimed is:

1. A coupling device of the type envisaged between a first vehicle (A) with at least two axes and a second vehicle (B) with at least two axes and comprising steering members (S) with the first vehicle (A) arranged to precede the second vehicle (B), said coupling device being particularly suitable for the application to convoys of automatically guided vehicles, said coupling device comprising a hinge coupling section associated with said first vehicle (A) and a drawbar section associated with the second vehicle (B), said sections each having a proximal portion rigidly connected to the respective vehicle and a distal reciprocal connection portion with the possibility of rotation, wherein said drawbar section comprises:
    an arc-shaped guide integral with said second vehicle (B), said arc-shaped guide being extended horizontally between a right side and a left side of said second vehicle (B), the radius of curvature and the positioning of said arc-shaped guide being such that the centre of the relative radius of curvature is in a rear area of said second vehicle (B);
    a slider arranged to slide along said arc-shaped guide;
    a telescopic connecting arm rigidly connected at one end to said slider and rotatably connected at the other end thereof to said coupling section, said telescopic connecting arm having a maximum length and a minimum length such as to define a maximum distance and a minimum distance, respectively, between said first vehicle (A) and said second vehicle (B),
    wherein said drawbar section comprises a steering assistance mechanism associated with said slider and said steering members (S) of said second vehicle (B), said steering assistance mechanism being configured to act on said steering members (S) so as to tend to maintain a steering position of said second vehicle (B) which is a function of the position of said slider along said arc-shaped guide.

2. The coupling device according to claim 1, wherein said steering assistance mechanism comprises a telescopic rod for connection to said slider, two hub carrier connecting rods which connect said steering assistance mechanism to the steering members (S) of said second vehicles (B), and an actuating mechanism which kinematically connects said telescopic rod with said hub carrier connecting rods.

3. The coupling device according to claim 2, wherein said actuating mechanism comprises an eccentric member to which said hub carrier connecting rods and an articulated parallelogram mechanism are connected, which connects said telescopic rod with said eccentric member, so that a rotation of said telescopic rod which takes place following the movement of said slider along said arc-shaped guide modifies the position and the geometry of said articulated parallelogram mechanism which changes the position and orientation of said eccentric member which in turn pushes or pulls said hub carrier connecting rods thus operating the steering members (S) of the second vehicle (B).

4. The coupling device according to claim 1, wherein said drawbar section comprises resilient members arranged to oppose the elongation of said telescopic connecting arm with respect to a neutral configuration.

5. The coupling device according to claim 1, wherein said drawbar section comprises resilient members arranged to oppose the shortening of said telescopic connecting arm with respect to a neutral configuration.

6. The coupling device according to claim 1, wherein said drawbar section comprises locking members arranged to prevent the sliding of said slider along said arc-shaped guide when said telescopic connecting arm reaches said minimum length.

7. A coupling device of the type envisaged between a first vehicle (A) with at least two axes and a second vehicle (B) with at least two axes and comprising steering members (S) with the first vehicle (A) arranged to precede the second vehicle (B), said coupling device being particularly suitable for the application to convoys of automatically guided vehicles, said coupling device comprising a hinge coupling section associated with said first vehicle (A) and a drawbar section associated with the second vehicle (B), said sections each having a proximal portion rigidly connected to the respective vehicle and a distal reciprocal connection portion with the possibility of rotation, wherein said drawbar section comprises:
    an arc-shaped guide integral with said second vehicle (B), said arc-shaped guide being extended horizontally between a right side and a left side of said second vehicle (B), the radius of curvature and the positioning of said arc-shaped guide being such that the centre of the relative radius of curvature is in a rear area of said second vehicle (B);
    a slider arranged to slide along said arc-shaped guide;
    a telescopic connecting arm rigidly connected at one end to said slider and rotatably connected at the other end thereof to said coupling section, said telescopic connecting arm having a maximum length and a minimum length such as to define a maximum distance and a minimum distance, respectively, between said first vehicle (A) and said second vehicle (B), wherein said telescopic connecting arm comprises a towing eye which constitutes the distal portion of said drawbar section provided at one end with an annular body for connecting with said coupling section, at the opposite end of the towing eye there being present a tubular element which is telescopically inserted into a bell-shaped element integral with said slider, said tubular element having a shoulder in a longitudinally intermediate section which constitutes an abutment element for a first compression spring which acts between said shoulder and said slider thus constituting resilient members arranged to oppose the shortening of the telescopic connecting arm with respect to a neutral configuration, and for a second compression spring which acts between said shoulder and said bell-shaped element thus constituting resilient members arranged to oppose the elongation of said telescopic connecting arm with respect to a neutral configuration.

8. The coupling device according to claim 7, wherein said shoulder consists of a clamping ring removably associated with said tubular element.

9. The coupling device according to claim 7, wherein said tubular element and a shoe of the slider are configured and arranged in such a way that when said tubular element reaches the proximity of the relative end-of-stroke it operates said shoe pushing it to engage with said arc-shaped guide and thus causing the blocking of the sliding movement of said slider along said arc-shaped guide.

10. A coupling device of the type envisaged between a first vehicle (A) with at least two axes and a second vehicle (B) with at least two axes and comprising steering members (S) with the first vehicle (A) arranged to precede the second vehicle (B), said coupling device being particularly suitable for the application to convoys of automatically guided vehicles, said coupling device comprising a hinge coupling section associated with said first vehicle (A) and a drawbar section associated with the second vehicle (B), said sections each having a proximal portion rigidly connected to the respective vehicle and a distal reciprocal connection portion with the possibility of rotation, wherein said drawbar section comprises:

an arc-shaped guide integral with said second vehicle (B), said arc-shaped guide being extended horizontally between a right side and a left side of said second vehicle (B), the radius of curvature and the positioning of said arc-shaped guide being such that the centre of the relative radius of curvature is in a rear area of said second vehicle (B);

a slider arranged to slide along said arc-shaped guide;

a telescopic connecting arm rigidly connected at one end to said slider and rotatably connected at the other end thereof to said coupling section, said telescopic connecting arm having a maximum length and a minimum length such as to define a maximum distance and a minimum distance, respectively, between said first vehicle (A) and said second vehicle (B), wherein said second vehicle (B) comprises a front axle provided with said steering members (S) and at least one non-steering rear axle wherein the geometry of the arc-shaped guide and the relative connection methods to the frame of the second vehicle (B) are such that following the movement of the slider and therefore also of the telescopic connecting arm along the arc-shaped guide the point of application of force on the following vehicle (B) is maintained at the centreline of said at least one rear axle of the same second vehicle (B).

* * * * *